(12) United States Patent
Levi

(10) Patent No.: US 8,609,990 B2
(45) Date of Patent: Dec. 17, 2013

(54) GASKET FOR ELECTRIC CABLES

(75) Inventor: Bruno Levi, Brescia (IT)

(73) Assignee: Palazzoli S.p.A., Brescia (IT)

( * ) Notice: Subject to any disclaimer, the term of this patent is extended or adjusted under 35 U.S.C. 154(b) by 0 days.

(21) Appl. No.: 13/394,413

(22) PCT Filed: Sep. 28, 2010

(86) PCT No.: PCT/EP2010/005897
§ 371 (c)(1),
(2), (4) Date: Mar. 6, 2012

(87) PCT Pub. No.: WO2010/042128
PCT Pub. Date: Apr. 14, 2011

(65) Prior Publication Data
US 2012/0181754 A1    Jul. 19, 2012

(30) Foreign Application Priority Data
Oct. 8, 2009 (IT) ............... MI2009A1721

(51) Int. Cl.
*H02G 3/22* (2006.01)
*H02G 3/18* (2006.01)

(52) U.S. Cl.
USPC ............... 174/152 G; 174/153 G; 174/650; 174/152 R; 16/2.1; 16/2.2; 277/627

(58) Field of Classification Search
USPC .......... 174/152 G, 153 G, 152 R, 135, 17 CT, 174/72 A, 142, 92, 650; 16/2.1, 2.2; 248/56, 248/74.4; 439/271; 277/616, 627, 650, 625, 277/626, 602
See application file for complete search history.

(56) References Cited

U.S. PATENT DOCUMENTS

| | | | | |
|---|---|---|---|---|
| 2,573,600 | A * | 10/1951 | Pruehs | 174/153 G |
| 5,155,303 | A | 10/1992 | Bensel, III et al. | |
| 5,836,048 | A * | 11/1998 | Rossman et al. | 174/153 G |
| 5,844,171 | A * | 12/1998 | Fitzgerald | 174/92 |
| 6,119,305 | A * | 9/2000 | Loveall et al. | 174/153 G |
| 6,376,777 | B1 | 4/2002 | Ito et al. | |
| 7,442,884 | B2 * | 10/2008 | Ball et al. | 174/152 R |
| 7,930,800 | B1 * | 4/2011 | Castrale et al. | 174/153 G |
| 7,938,371 | B2 * | 5/2011 | Oga et al. | 248/74.4 |
| 8,033,408 | B2 * | 10/2011 | Makela et al. | 174/152 G |
| 2008/0245547 | A1 | 10/2008 | Low et al. | |

FOREIGN PATENT DOCUMENTS

| | | |
|---|---|---|
| EP | 0 514 174 A1 | 11/1992 |
| JP | 9023560 A | 1/1997 |
| JP | 92711132 A | 10/1997 |

* cited by examiner

*Primary Examiner* — Angel R Estrada
(74) *Attorney, Agent, or Firm* — R. Neil Sudol; Coleman Sudol Sapone, P.C.

(57) ABSTRACT

A gasket for electric cables includes a main portion made of elastic material; a through hole that passes longitudinally through the main body and constitutes the seat of a cable to be insulated; a longitudinal slit passes through the body of the gasket and connects the through seat to the outside, allowing, by virtue of the elastic deformability of the material of the gasket, the insertion of the cable in the through seat.

9 Claims, 5 Drawing Sheets

GASKET FOR ELECTRIC CABLES

BACKGROUND OF THE INVENTION

The present invention relates to a gasket for electric cables.

As is known, an electric cable can be connected to a device by means of a sealing system that ensures the required degree of protection.

Conventional sealing systems, such as cable glands, are generally constituted by a gasket that surrounds the cable and by a locking device that prevents the cable from moving and at the same time makes the gasket adhere to the cable and to the support in order to prevent infiltrations.

Various types of cable gland are known, and sealing gaskets also can be constituted by simple rings made of elastomer or have complex shapes.

For example, spiral gaskets are known which offer the advantage that they can be applied to the cable without cutting it and therefore they can be applied to a continuous through cable.

Those spiral gaskets, however, are rather laborious to be applied especially in difficult working conditions.

OBJECTS OF THE INVENTION

The aim of the present invention is to provide a sealing gasket that can be applied to the cable very easily and quickly.

Within the scope of this aim, an object of the invention is to provide a gasket that ensures a high degree of protection and tightness.

Another important object of the invention is to provide a sealing gasket that can be used for a wide range of cable cross-sections.

A further object of the invention is to provide a gasket that can be applied to a through cable.

Another object is to provide a gasket that is versatile and can be used advantageously for various types of cables and electrical devices.

Another object of the present invention is to provide a gasket which, by virtue of its particular constructive characteristics, is capable of giving the greatest assurances of reliability and safety in use.

SUMMARY OF THE INVENTION

This aim and these and other objects that will become better apparent hereinafter are achieved by a gasket, particularly for electric cables, comprising a main portion made of elastic material, characterized in that it comprises a through hole that passes longitudinally through said main body and constitutes the seat of a cable to be insulated; a longitudinal slit passes through said main body and connects said through seat to the outside, allowing, by elastic deformability of said main portion, the insertion of said cable in said through seat.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein.

DETAILED DESCRIPTION

Figure 2:
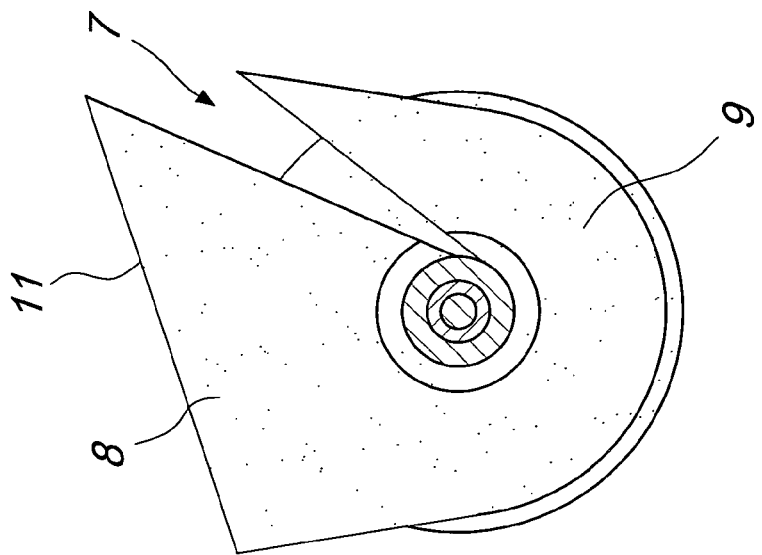
FIG. 2 is a transverse sectional rear view of the gasket.
Figure 1:
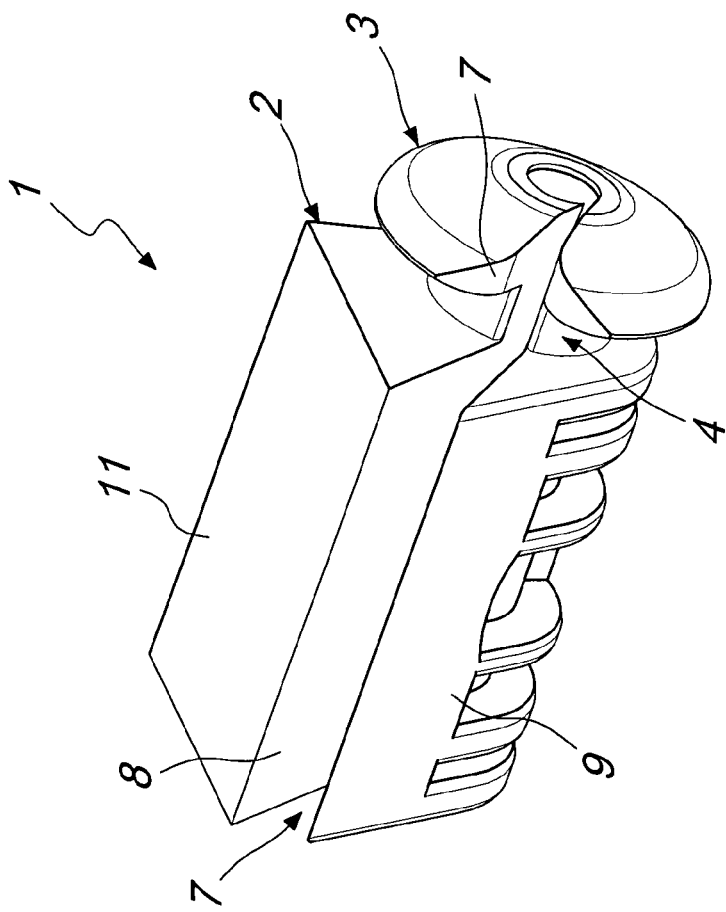
FIG. 1 is a perspective view of the gasket according to the present invention.
Figure 3:
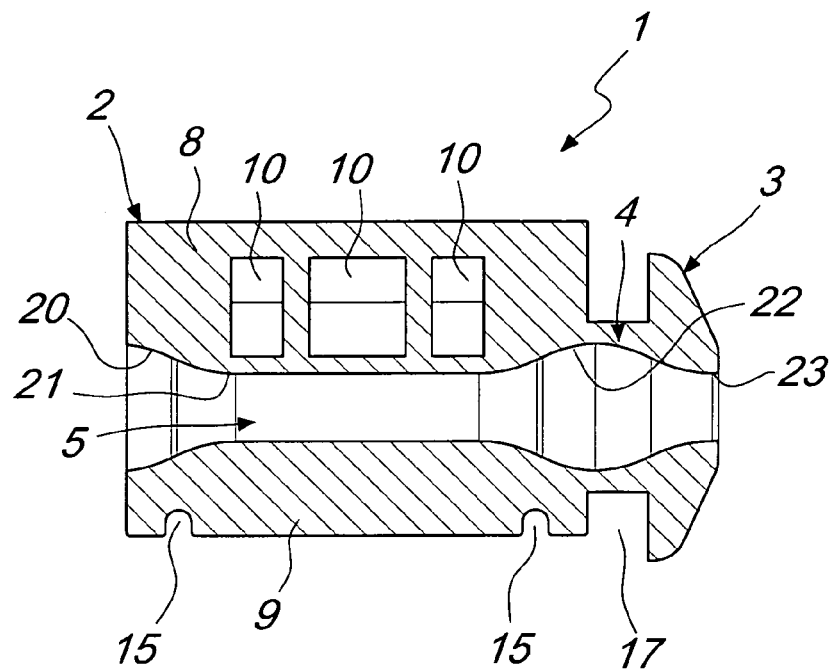
FIG. 3 is a sectional side view of the gasket, taken along the plane of FIG. 4.
Figure 4:
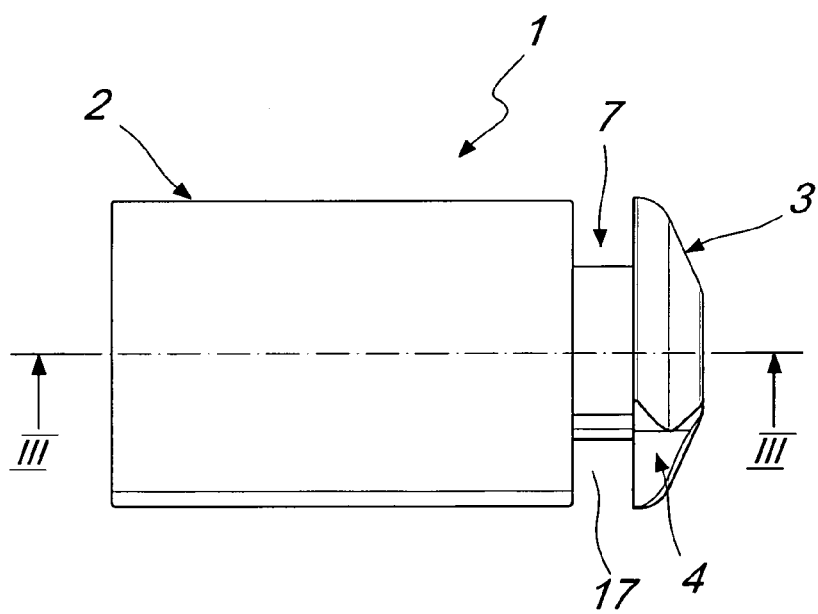
FIG. 4 is a plan view of the gasket.

With reference to the cited figures, the gasket according to the invention, generally designated by the reference numeral 1, comprises a body made of rubber material and constituted by a main portion 2, which is substantially cylindrical and is connected to a substantially frustum-shaped shield 3 by means of a connecting portion 4, whose diameter is smaller than the diameter of the main portion and smaller than the diameter of the base of the shield 3.

The entire gasket is crossed by a through hole 5, which constitutes the seat of a cable 6 to be insulated.

A longitudinal slit 7, which passes through the entire gasket, connects the through seat 5 to the outside allowing, by the elastic deformability of the material that constitutes the gasket, the insertion of the cable 6 in the through seat 5.

The main body 2 of the gasket is divided by slit 7 into two longitudinal portions, a portion 8 with greater deformability and a portion 9 with lower deformability, that face one another across the slit 7.

The portion 8 with greater deformability is partially hollow by virtue of enclosed cavities or chambers 10 and has a substantially flat surface 11, on which a presser 12 which is part of the containment body 13 of the gasket.

The gasket 1 is in fact adapted to ensure insulation between the cable 6 and the inside of the containment body 13.

The containment body can be constituted by any electrical device, such as a hermetic box for electrical devices, such as for example a junction box, a connector, a control device, etcetera.

The through hole 5 has differentiated cross-sections: a first cross-section 23, which is connected to a second cross-section 22, which is wider and in turn is connected to a central cross-section 21, which is smaller than the second cross-section 22 and in turn is connected to a terminal cross-section 20.

The main body 2 is more easily deformable, in other words softer, at the narrower central cross-section 21, so that when the gasket is closed inside the cable gland, formed by the presser 12 and by the containment body 13, the cable 6 is completely surrounded within the through seat 5, thus ensuring the tightness of the connection.

Figure 6:
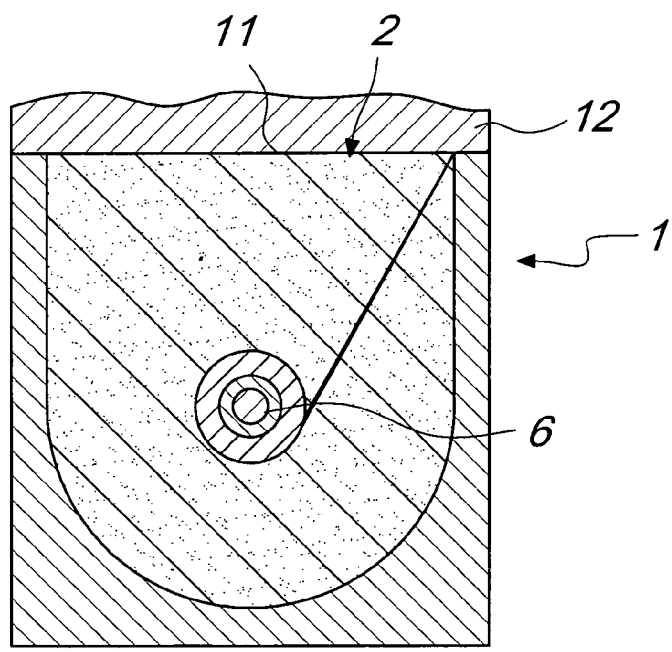
FIG. 6 is a transverse sectional view of the gasket in working conditions with a cable having a smaller cross-section.
Figure 7:
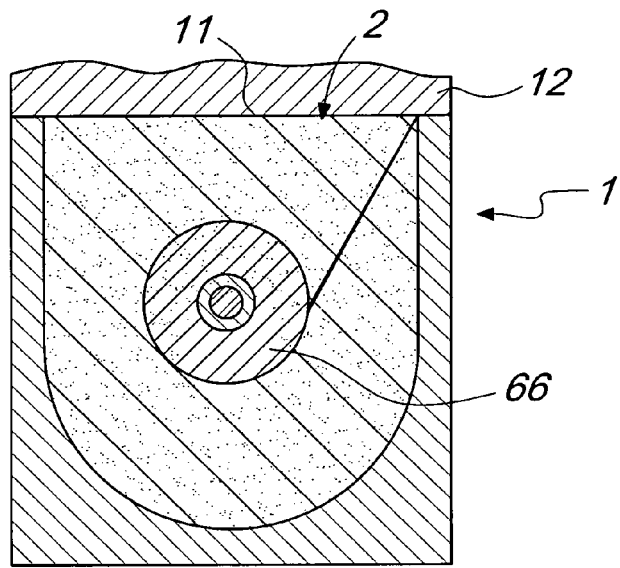
FIG. 7 is a transverse sectional view of the gasket in working conditions with a cable having a larger cross-section.
Figure 8:
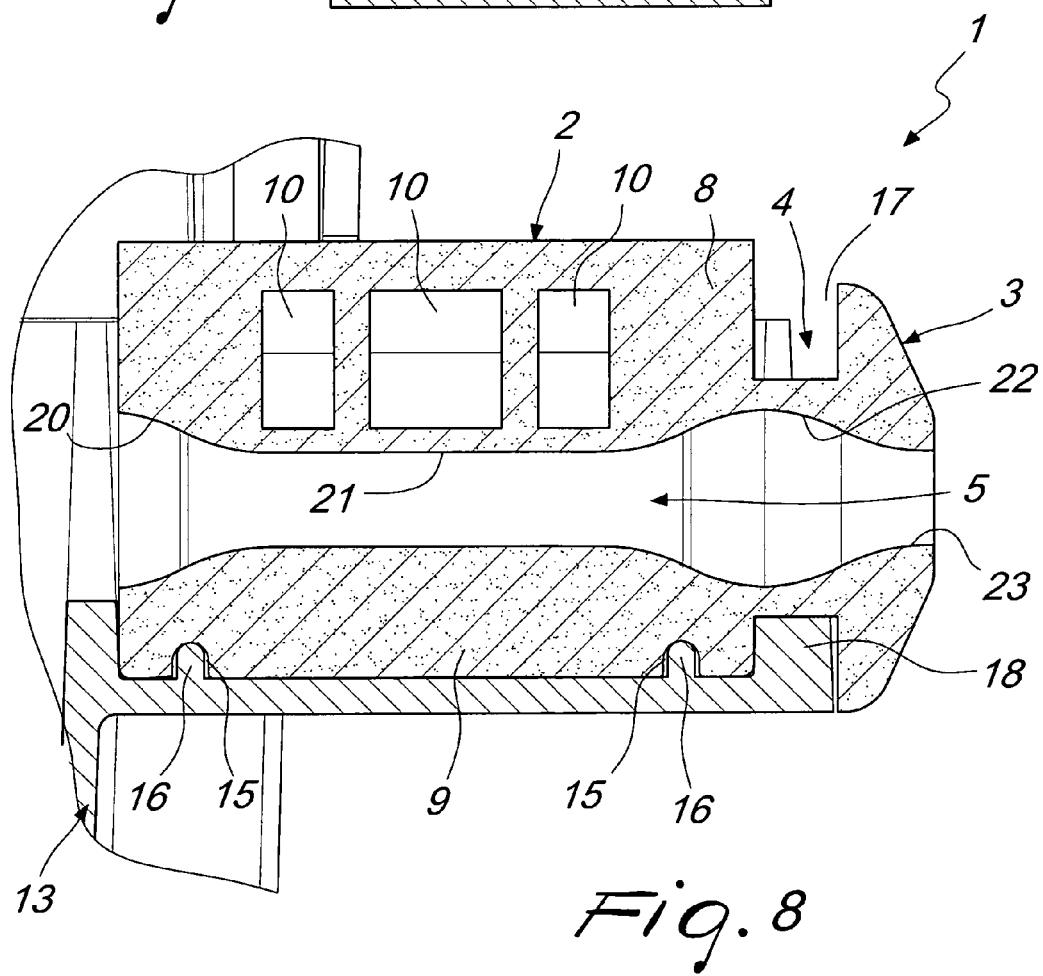
FIG. 8 is a longitudinally sectional side view of the gasket inserted in the working seat.

The shape with differentiated cross-sections of the through seat 5 and the different resistance to deformation of the body of the gasket allow to use the gasket for cables having different cross-section, as shown schematically in FIGS. 6 and 7, which show the use of the same gasket for a cable having a smaller cross-section (FIG. 6) and a cable having a larger cross-section (FIG. 7).

The main portion 2 of the body of the gasket also comprises one or more annular slots 15, which are preferably arranged proximate to the ends of the main portion and are adapted to be engaged by annular protrusions 16 of the containment body 13 when the gasket is in the working position.

The annular protrusions 16 cooperate with the annular slots 15 to ensure a correct position of the gasket and prevent deformations of the gasket caused by the pressing action of the presser 12.

The connecting portion 4 has a diameter that is smaller than the diameter of the main portion 2 and forms an annular recess 17 between the shield 3 and the main portion 2. The annular recess 17 is partially engaged by an edge 18 of the containment body 13, which prevents infiltrations of fluids or powders which may go around the shield 3.

The operation of the gasket according to the present invention is as follows.

The gasket 1 is applied to the cable 6 by inserting the cable in the through seat 5 through the slit 7.

Figure 5:
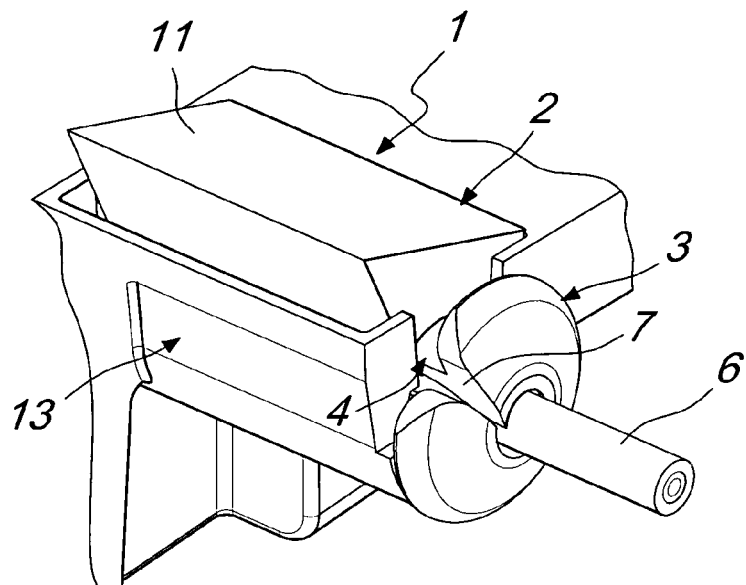
FIG. 5 is a perspective view of the gasket in working conditions before applying the closure.

The gasket 1, with the inserted cable, is arranged within the containment body 13, as shown in FIG. 5, and then the presser 12 is closed on the containment body, compressing the gasket.

Figure 9:
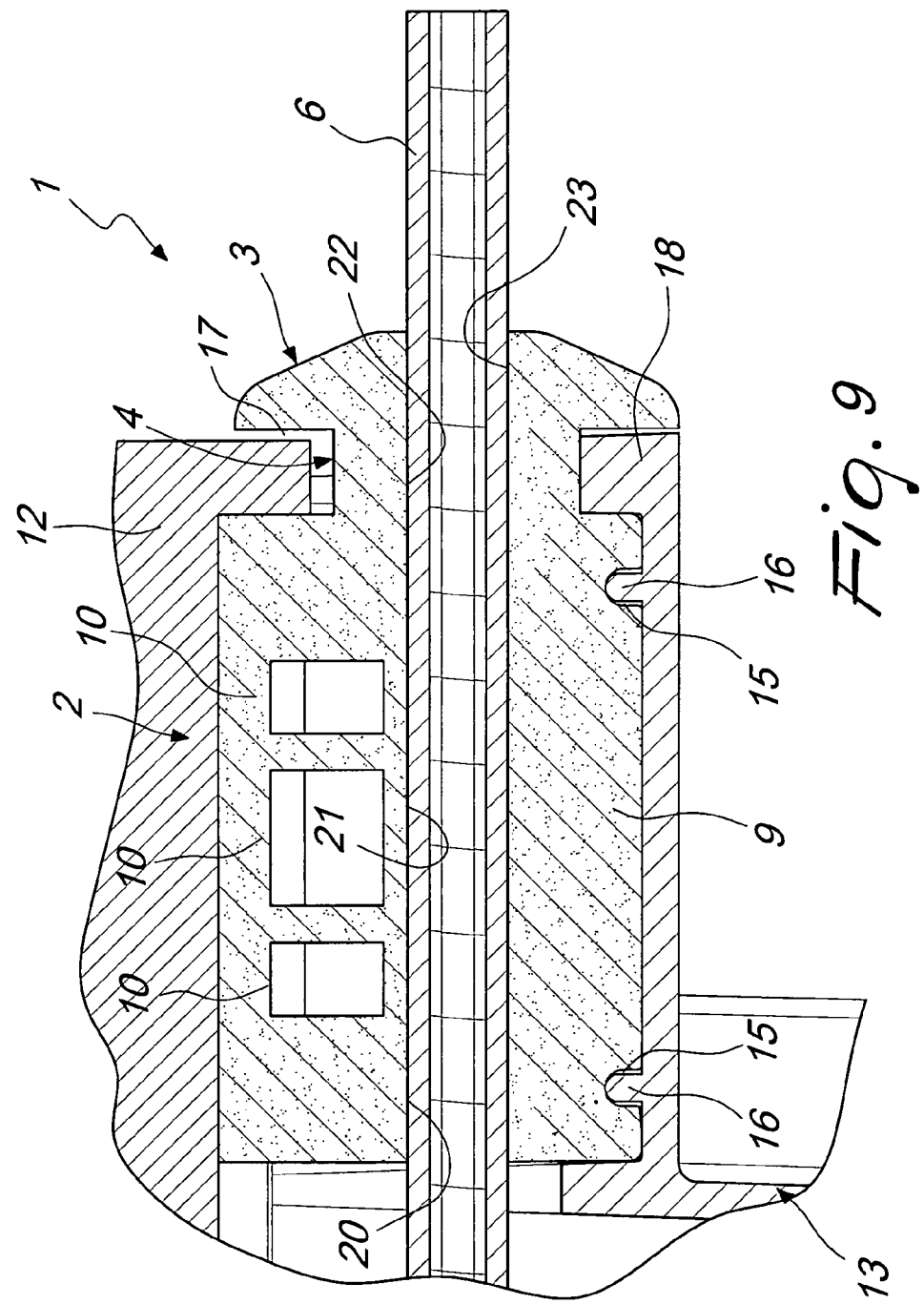
FIG. 9 is a view, similar to the preceding one, of the gasket in working conditions.

In this manner, the cable is locked and perfectly hermetic, because the differentiated deformability of the elastic body of the gasket causes the internal surface of the through seat to adhere to the cable along its entire length, as can be seen in FIG. 9.

As shown schematically in FIGS. 6 and 7, complete adhesion of the gasket to the cable is ensured for a wide range of different cross-sections of the cable by virtue of the configuration of the through seat 5, which has differentiated cross-sections, and by virtue of the diagonal slit 7, which is sealed perfectly by virtue of the pressure applied by the walls of the containment body and by the presser 12.

In practice it has been found that the invention achieves the intended aim and objects, a gasket having been provided which can be applied to a through cable quickly and easily and ensures tightness for a wide range of cables having a different cross-section.

This application claims the priority of Italian Patent Application No. MI2009A001721, filed on Oct. 8, 2009, the subject matter of which is incorporated herein by reference.

The invention claimed is:

1. A gasket, particularly for electric cables, comprising a main body made of elastic material, wherein: a through hole passes longitudinally through said main body and constitutes the seat of a cable to be insulated; a longitudinal slit passes through said main body and connects said through hole to the outside, allowing, by elastic deformability of said main body, the insertion of said cable in said through hole; said main body is divided into two longitudinal portions facing one another across said slit, said two longitudinal portions including a first portion with greater deformability and a second portion with lower deformability.

2. The gasket according to claim 1, wherein: said main body is connected to a shield by means of a connecting portion; said connecting portion has a diameter smaller than the diameter of the main body; said main body, said shield and said connecting portion are monolithically made of said elastic material; said through hole and said slit of passing through said main body, said shield and said connecting portion.

3. The gasket according to claim 2, wherein said first portion with greater deformability comprises cavities and a substantially flat surface on which a presser acts which is part of a containment body of said gasket.

4. The gasket according to claim 3, wherein said main body comprises one or more annular slots, which are arranged proximate to the ends of said main body and are adapted to be engaged by annular protrusions of said containment body when the gasket is in a working position.

5. The gasket according to claim 3, wherein said connecting portion, which has a diameter that is smaller than the diameter of said main body, forms an annular recess between said shield and said main body; said annular recess is partially engaged by an edge of said containment body.

6. The gasket according to claim 4, wherein in said working position at least said main body is inserted in said containment body, which is closed by said presser, compressing said main body.

7. A gasket, particularly for electric cables, comprising a main body made of elastic material, wherein: a through hole passes longitudinally through said main body and constitutes the seat of a cable to be insulated; a longitudinal slit passes through said main body and connects said through hole to the outside, allowing, by elastic deformability of said main body, the insertion of said cable in said through hole, wherein said through hole has differentiated cross-sections: a first cross-section, which is connected to a second wider cross-section, which in turn is connected to a central cross-section, which is smaller than said second cross-section and in turn is connected to a terminal cross-section.

8. The gasket according to claim 7, wherein: said main body is more easily deformable, or softer, at said central cross-section, so that when the gasket is closed inside a cable gland formed by the presser and by said containment body, said cable is completely surrounded within the through hole, thus ensuring the hermetic tightness of the connection.

9. A gasket, particularly for electric cables, comprising a main body made of elastic material, wherein: a through hole passes longitudinally through said main body and constitutes the seat of a cable to be insulated; a longitudinal slit passes through said main body and connects said through hole to the outside, allowing, by elastic deformability of said main body, the insertion of said cable in said through hole, said main body being divided into a first longitudinal portion with greater deformability and second longitudinal portion with lower deformability, said second longitudinal portion being partially hollow and provided with at least one enclosed cavity or chamber.

* * * * *